(12) United States Patent
Schulz

(10) Patent No.: US 7,266,256 B1
(45) Date of Patent: Sep. 4, 2007

(54) HIGH DATA-RATE OPTICAL MODULATOR BIAS CIRCUIT

(75) Inventor: Craig Schulz, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/394,811

(22) Filed: Mar. 31, 2006

(51) Int. Cl.
*G02F 1/01* (2006.01)

(52) U.S. Cl. .................................. 385/1; 385/2; 385/3

(58) Field of Classification Search ................. 385/1–3
See application file for complete search history.

(56) References Cited

U.S. PATENT DOCUMENTS 7,106,486 B1 * 9/2006 Nahapetian et al. ........ 359/238

2006/0228121 A1 * 10/2006 Tolliver et al. ............. 398/198

\* cited by examiner

*Primary Examiner*—Jennifer Doan
(74) *Attorney, Agent, or Firm*—Blakely, Sokoloff, Taylor & Zafman LLP

(57) ABSTRACT

In one embodiment, an apparatus for a high data-rate optical modulator bias circuit is disclosed. The apparatus comprises an optical modulator, a voltage-controlled voltage source to translate a control voltage into a voltage referenced to a voltage supply to the optical modulator, a buffer amplifier with high current sinking capability to supply a bias voltage to the optical modulator, and a bias-T to couple the bias voltage to a data port of the optical modulator. Other embodiments are also described.

16 Claims, 4 Drawing Sheets

HIGH DATA-RATE OPTICAL MODULATOR BIAS CIRCUIT

FIELD OF THE INVENTION

The embodiments of the invention relate generally to the field of optical modulators and, more specifically, relate to a high data-rate optical modulator bias circuit.

BACKGROUND

Optical modulators are devices that allow for the manipulation of a property of light, such as in an optical beam. This optical beam may be, for example, a laser beam. One type of optical modulator is an electro-absorption modulator (EAM) that is used for the transmitters in optical fiber communications. Other types of optical modulators include acousto-optic modulators, interferometric modulators, liquid crystal modulators, chopper wheals, fiber-optic modulators, and micromechanical modulators.

In the case of EAMs, these devices operate with lower voltages than other optical modulators, such as electro-optic modulators. They can also be operated at high speed. For example, a modulation bandwidth of tens of gigahertz can be achieved, making these devices useful for optical fiber-communications. An EAM can be integrated with a feedback laser diode, such as an electrically modulated laser (EML), on a single chip to form a data transmitter.

Typically, in the case of an EML with an integrated EAM, the laser will have a positive bias (voltage and current) while the modulator will have a negative bias (voltage and current). In such a situation, a negative power supply will be necessary. However, negative power supplies are not always readily available. Presently, bias circuits depend on negative voltage converters or regulators for generating reverse bias voltages for ground referenced EAMs, but this solution requires more parts, higher cost, more board space, and more direct current (DC) power consumption.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

An apparatus and method for a bypass technique for a high data-rate optical modulator bias circuit are disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the present invention describe a method and respective circuit to implement a high data-rate optical modulator bias circuit. Embodiments of the high data-rate optical modulator bias circuit apply a reverse direct current (DC) bias voltage onto the high data rate optical modulator via its modulation input port. Embodiments of the invention support applications where negative voltage sources are unavailable and where space and power are severely constrained.

Figure 1:
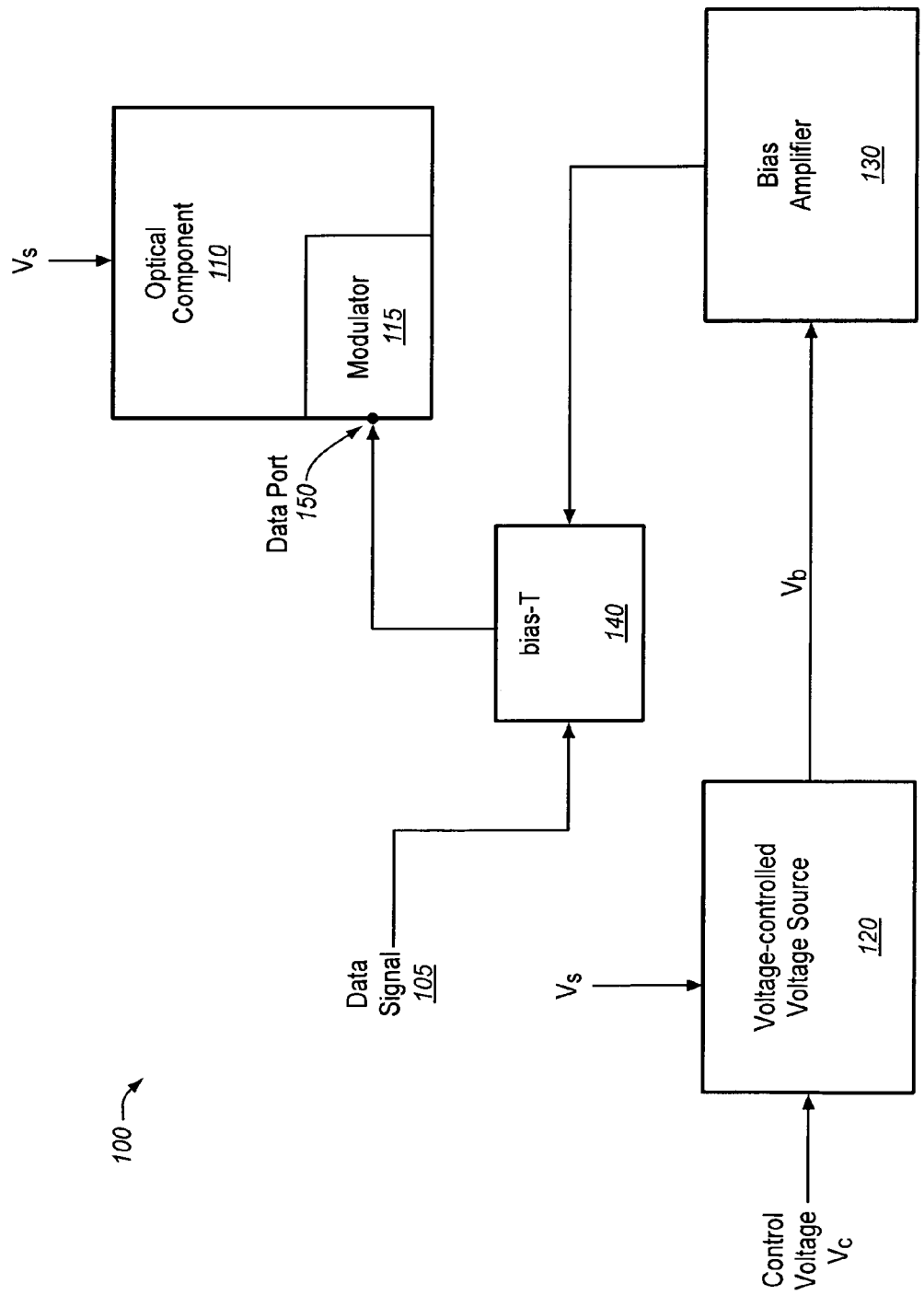
FIG. 1 illustrates a block diagram of a high-data rate optical modulator bias circuit.

FIG. 1 is a block diagram illustrating one embodiment of a high-data rate optical modulator bias circuit. The circuit 100 includes an optical modulator 115, such as an electro-absorptive modulator (EAM). In some embodiments, the optical modulator 115 may be part of an optical component 110. The optical component 110 may be a laser, such as an electro-absorption modulated laser (EML). The optical modulator 115 receives a data signal 105 that may be transmitted by the optical component 110. The optical modulator 115 may control properties of the optical component 110 in transmitting the data signal 105.

Circuit 100 further includes three major sections: (1) a voltage-controlled voltage source 120 that translates a control voltage, $V_c$, into a voltage referenced to the modulator's 115 voltage supply, $V_s$; (2) a buffer amplifier 130 with high current sinking capability that supplies a bias voltage, $V_b$, to the modulator 115; and (3) a bias-T 140 that couples the bias voltage, $V_b$, and the data signal 105 into a data port 150 of the modulator 115.

Embodiments of the invention are particularly well-suited for EAMs, or EMLs which incorporate EAMs. The EAM's reverse bias voltage is a major factor in determining the modulator's insertion loss, extinction ratio, and chirp. A stable bias is important to maintain the modulator at peak performance.

In some embodiments, the circuit 100 maintains a constant bias voltage, $V_b$, even when the modulator cathode is connected to an unregulated voltage supply, $V_s$. In the circuit 100, ground (0V) is the lowest voltage rail available, so the modulator cathode voltage supply should be sufficiently large to handle the expected range of bias voltages and any additional circuit losses. In some embodiments, the bias circuit 100 includes sufficient current sinking capability to work with an EAM and/or an EML terminated with 50 ohms, with up to 2V modulator reverse bias.

Figure 2:
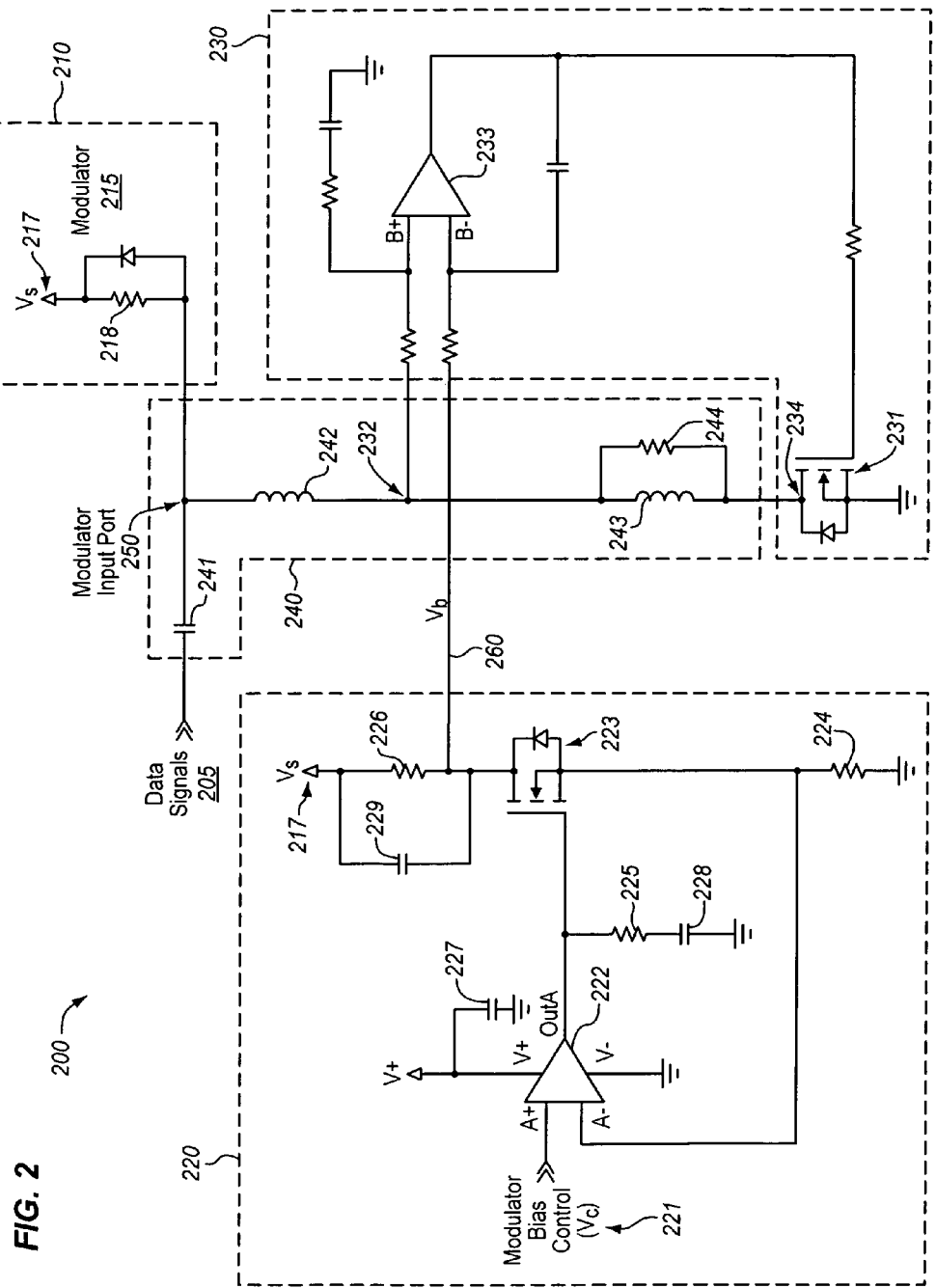
FIG. 2 is a circuit diagram of one embodiment of a high-data rate optical modulator bias circuit.

FIG. 2 is a circuit diagram depicting one embodiment of a high-data rate optical modulator bias circuit. In one embodiment, circuit 200 is the same as circuit 100 illustrated with respect to FIG. 1. Circuit 200 includes an optical component 210 such as a laser, a modulator 215 as part of the optical component 210, a voltage-controlled voltage source 220, a buffer amplifier 230, and a bias-T 240. The components of circuit 200 operate to apply a reverse DC bias voltage onto a high data rate optical modulator via its modulation input port 250.

The voltage-controlled voltage source 220 includes a current source with a fixed resistive load that takes a ground referenced control voltage, $V_c$, 221 corresponding to a particular EAM bias set point (with a linear relationship).

The voltage-controlled voltage source 220 converts the control voltage, $V_c$, into a bias voltage, $V_b$, 260 which is referenced to the modulator's cathode voltage, $V_s$, 217.

The control voltage, $V_c$, 221 may come from a variety of sources including a digital to analog converter or a low pass filtered pulse width modulator. The control voltage, $V_c$, 221 sets the value of the current source. In one embodiment, the current source of the voltage-controlled voltage source 220 includes the components of an operational amplifier (op amp) 222, an N-channel metal oxide semiconductor field-effect transistor (MOSFET) 223, three resistors 224, 225, 226, and three capacitors 227, 228, 229. The current source pulls current through load resistor 226 connected to the cathode supply voltage, $V_s$, 217 to thereby create the bias voltage, $V_b$, 260.

Bias voltage, $V_b$, is then input to the buffer amplifier circuit 230 with a voltage gain equal to 1. The buffer amplifier circuit 230 sinks current through the bias-T 240 by turning on an N-channel MOSFET 231 an appropriate amount to maintain $V_b$ 260 at the circuit node 232. Circuit node 232 connects the bias-T ferrite bead 242 and the inductor 243. The combination of MOSFET 231 and op amp 233 ensures that the circuit node 232 is set to the proper voltage. The MOSFET 231 provides a high current sink. Given that the ferrite bead 242 resistance may be 1 ohm or less, the voltage on the modulator 215 is essentially the same as $V_b$ (given typical operating bias-T currents). Therefore, as $V_s$ 217 varies, the cathode to anode voltage stays constant.

The bias-T 240 is a three port device where one port 205 permits alternating current (AC) signals to flow between it and the second port 250, while the third port 234 permits DC signals to flow between it and the second port 250. Ports one 205 and three 234 are isolated from each other for both AC and DC signals. In embodiments of the invention described here, the bias-T 240 inserts the bias voltage from the buffer amplifier 230 onto the data path leading to the data port of the modulator without attenuating or distorting the data signal.

The bias-T 240 may, in some embodiments, be a wideband bias-T. Important characteristics for the wideband bias-T are low loss at DC or at frequencies below the data bandwidth, and high loss at all frequencies within the data bandwidth. Other important considerations for a wideband bias-T are small size, allowing for integration in small form factor transceiver modules, and low component cost.

The bias-T 240 in circuit 200 utilizes four small, low cost components including a capacitor 241, a ferrite bead 242, an inductor 243, and a resistor 244. These components combine to create a low loss (e.g., less than 6 ohms) at DC, but high loss (e.g., greater than 300 ohms) from 500 kHz to 10 GHz. For example, these characteristics make it a useful bias-T for inserting the modulator bias voltage onto a 50 ohm transmission line while sending 10 Gbps data to the modulator in SONET, Ethernet, or other applications.

The ferrite bead 242 taps into the data transmission line (e.g., a micro-stripline or coplanar waveguide), and is connected to a shunt combination of the inductor 243 and the damping resistor 244. In one embodiment, the ferrite bead 242 may have about 1 ohm DC resistance and the inductor 243 may be a 100 uH inductor with about 4.8 ohm resistance. The capacitor 241 between the data driver 205 and the modulator 215 blocks DC to or from the driver 205 but passes the data signal unaffected. The data plus bias path is terminated at the modulator 215, which may be a 50 ohm resistance 218 in parallel with the modulator diode 215. The data path is connected to the modulator 215 diode anode, while the modulator 215 diode cathode is connected to a power supply, $V_s$ 217.

The other end of the bias-T is connected to MOSFET drain 231 with source connected to ground. Note that alternatively the MOSFET 231 may be replaced with a bipolar junction transistor (BJT). The amount of gate to source voltage on the MOSFET 231 determines the MOSFET drain-source resistance, which acts as a controllable current sink.

An alternative embodiment of the invention, not requiring negative voltages, may use a voltage regulator for the $V_s$ (modulator cathode) supply. A regulated voltage $V_s$ could possibly eliminate the current source, but this approach may have need of higher power due to the regulator loss and is not as accurate owing to the regulation tolerances. Yet another embodiment of the invention may use a differential amplifier to sense the modulator bias voltage and feedback to the bias control circuit instead of using a current source.

Embodiments of the invention may be constructed with discrete components, but alternatively much of the circuit could be integrated on one silicon die for further space and cost reduction in high volume applications.

Figure 3:
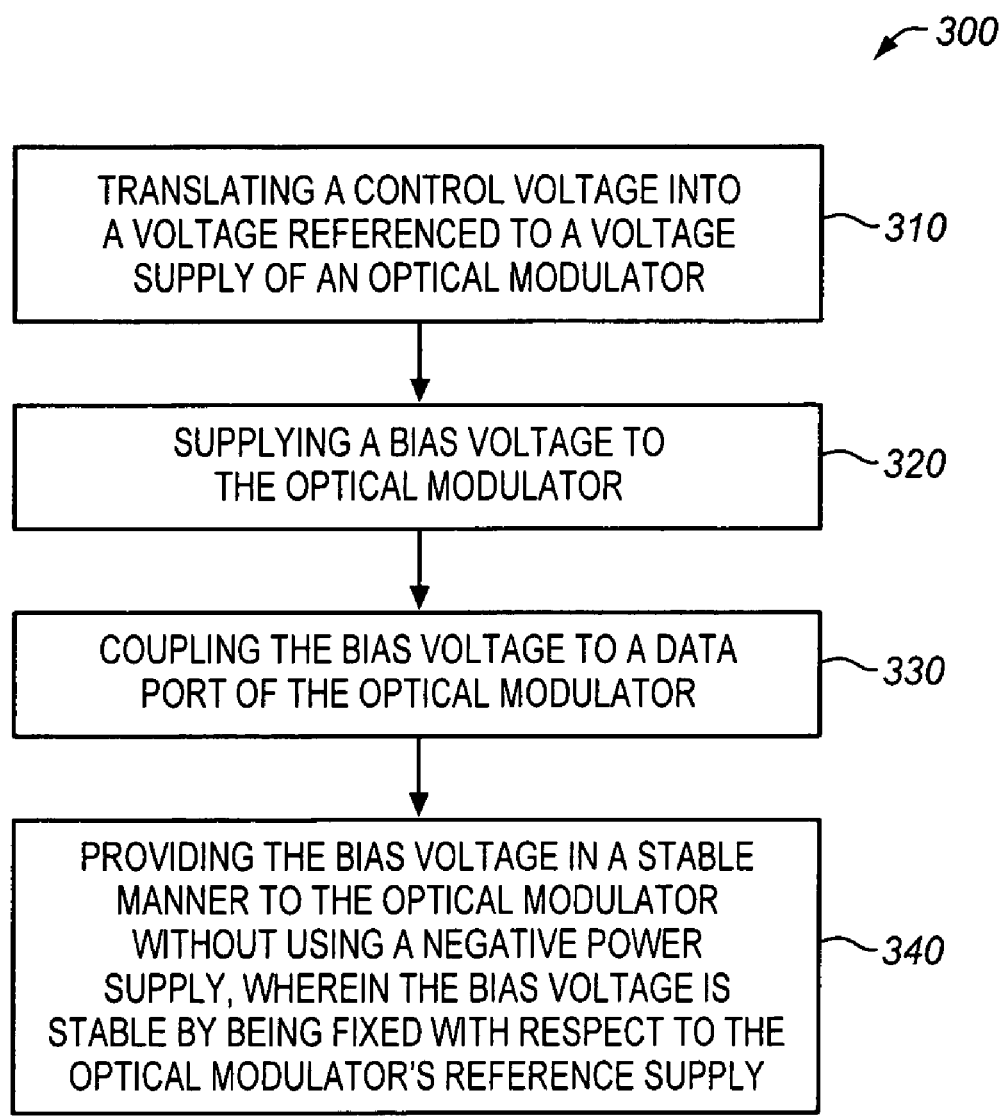
FIG. 3 is a flow diagram depicting a method of one embodiment of the invention.

FIG. 3 is a flow diagram of a method according to one embodiment of the invention. Process 300 provides a stable bias voltage to an optical modulator. In some embodiments, process 300 is performed by the components described with respect to FIGS. 1 and 2.

Process 300 begins at processing block 310 where a control voltage is translated into a voltage referenced to a voltage supply of an optical modulator. In one embodiment, the voltage-controlled voltage source 120, 220 of FIGS. 1 and 2 performs the translating. In one embodiment, the modulator is the same as modulator 115, 215 of either FIG. 1 or 2.

At processing block 320, a bias voltage is supplied to the optical modulator. In one embodiment, the buffer amplifier circuit 130, 230 of FIGS. 1 and 2 perform the supplying. Then, at processing block 330, the bias voltage is coupled to a data port of the optical modulator. In one embodiment, the bias-T 140, 240 of FIGS. 1 and 2 perform the coupling.

Finally, at processing block 340, the bias voltage is provided in a stable manner to the optical modulator without using a negative power supply. The bias voltage is stable by being fixed with respect to the optical modulator's reference power supply.

Figure 4:
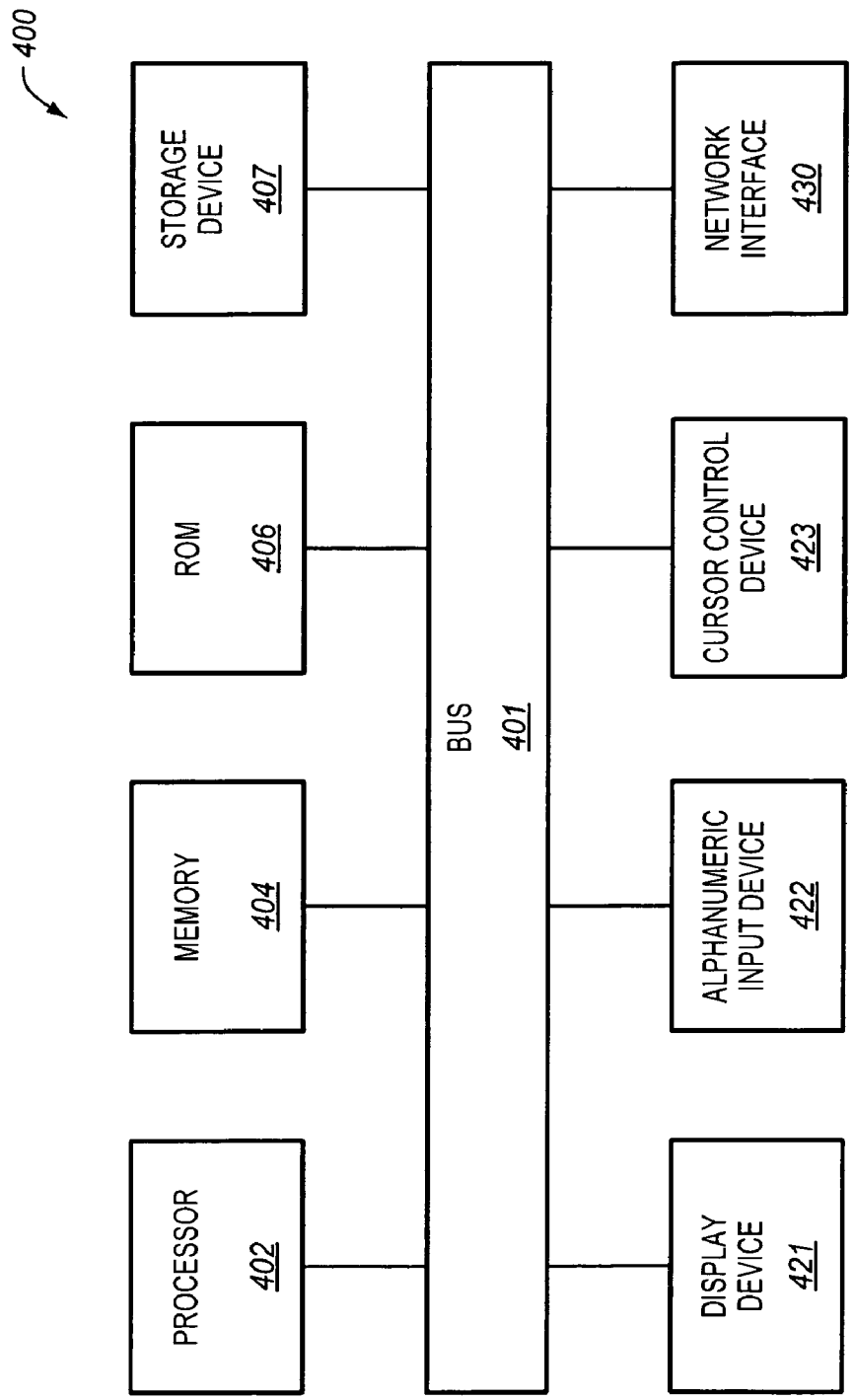
FIG. 4 illustrates a block diagram of one embodiment of an electrical system.

In one embodiment, the components of FIGS. 1 and 2 are part of an electrical system. The electronic system illustrated in FIG. 4 is intended to represent a range of electronic systems, for example, computer systems, network access devices, etc. Alternative systems, whether electronic or non-electronic, can include more, fewer and/or different components.

Electronic system 400 includes bus 401 or other communication device to communicate information, and processor 402 coupled to bus 401 to process information. In one embodiment, one or more lines of bus 401 are optical fibers that carry optical signals between components of electronic system 400. One or more of the components of electronic system 400 having optical transmission and/or optical reception functionality can include an optical modulator and bias circuit as described in embodiments of the invention.

While electronic system 400 is illustrated with a single processor, electronic system 400 can include multiple processors and/or co-processors. Electronic system 400 further includes random access memory (RAM) or other dynamic storage device 404 (referred to as memory), coupled to bus 401 to store information and instructions to be executed by processor 402. Memory 404 also can be used to store temporary variables or other intermediate information during execution of instructions by processor 402.

Electronic system 400 also includes read only memory (ROM) and/or other static storage device 406 coupled to bus 401 to store static information and instructions for processor 402. Data storage device 407 is coupled to bus 401 to store information and instructions. Data storage device 407 such as a magnetic disk or optical disc and corresponding drive can be coupled to electronic system 400.

Electronic system 400 can also be coupled via bus 401 to display device 421, such as a cathode ray tube (CRT) or liquid crystal display (LCD), to display information to a computer user. Alphanumeric input device 422, including alphanumeric and other keys, is typically coupled to bus 401 to communicate information and command selections to processor 402. Another type of user input device is cursor control 423, such as a mouse, a trackball, or cursor direction keys to communicate direction information and command selections to processor 402 and to control cursor movement on display 421. Electronic system 400 further includes network interface 430 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 430) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Embodiments of the invention are novel in their apparatus and method of providing a stable optical modulator bias voltage without the use of negative power supplies by using a current source to derive a voltage that is fixed with respect to an optical modulator cathode reference supply. The current source typically has better accuracy than if a differential amplifier were used to sense the modulator bias voltage. The way in which the current-source-derived voltage feeds the input of the bias buffer amplifier 330 and the way the feedback of the buffer amplifier 330 drives the buffer to sink the requisite modulator bias current to maintain the modulator bias are also novel.

The specific design of the voltage-controlled voltage source and buffer amplifier circuits ensures stability. In addition, the specific design of the bias-T results in a low cost and small footprint, low loss, and good performance. The process by which the buffer amplifier taps between the ferrite bead and the inductor of the bias-T for feedback to obtain accuracy on bias setting and stability is also novel.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. An apparatus, comprising:
an optical modulator;
a voltage-controlled voltage source to translate a control voltage into a voltage referenced to a voltage supply to the optical modulator, including:
a current source;
an operational amplifier;
a N-channel metal oxide semiconductor field-effect transistor (MOSFET);
a plurality of resistors; and
a plurality of capacitors;
a buffer amplifier with high current sinking capability to supply a bias voltage to the optical modulator; and
a bias-T to couple the bias voltage to a data port of the optical modulator.

2. The apparatus of claim 1, wherein the modulator is an electro-absorptive modulator (EAM) for an externally modulated laser (EML).

3. The apparatus of claim 1, wherein the bias voltage is a reverse bias voltage that is supplied to the optical modulator when the modulator is connected to an unregulated voltage supply.

4. The apparatus of claim 1, wherein the bias-T couples the bias voltage to the data port without distorting a data signal passing through the data port to the optical modulator.

5. An apparatus, comprising:
an optical modulator;
a voltage-controlled voltage source to translate a control voltage into a voltage referenced to a voltage supply to the optical modulator;
a buffer amplifier with high current sinking capability to supply a bias voltage to the optical modulator, including:
an operational amplifier;
a plurality of resistors;
a plurality of capacitors; and
a MOSFET to provide a high current sink; and
a bias-T to couple the bias voltage to a data port of the optical modulator.

6. The apparatus of claim 5, wherein feedback from the buffer amplifier drives the buffer amplifier to sink bias current of the optical modulator.

7. The apparatus of claim 5, wherein the bias-T includes a capacitor, a ferrite bead, an inductor, and a resistor.

8. A system, comprising:
an optoelectronic component;
a modulator coupled to the optoelectronic component to control the optoelectronic component; and
a circuit coupled to the modulator including:
a voltage-controlled voltage source to translate a control voltage into a voltage referenced to a voltage supply to the optical modulator, including:
a current source;
an operational amplifier;
a N-channel metal oxide semiconductor field-effect transistor (MOSFET);
a plurality of resistors; and
a plurality of capacitors;
a buffer amplifier with high current sinking capability to supply a bias voltage to the optical modulator; and
a bias-T to couple the bias voltage to a data port of the optical modulator.

9. The system of claim 8, wherein the bias voltage is a reverse bias voltage that is supplied to the optical modulator when the modulator is connected to an unregulated voltage supply.

10. The system of claim 9, wherein the unregulated voltage supply is at least one or referenced to ground or a positive supply.

11. The system of claim 8, wherein the buffer amplifier includes an operational amplifier, a plurality of resistors, a plurality of capacitors, and a MOSFET, wherein the MOSFET provides a high current sink.

12. The system of claim 11, wherein the buffer amplifier obtains feedback from the ferrite bead and the inductor to maintain accuracy of the bias voltage.

13. The system of claim 8, wherein the bias-T includes a capacitor, a ferrite bead, an inductor, and a resistor.

14. A method, comprising:
 a voltage-controlled voltage source translating a control voltage into a voltage referenced to a voltage supply of an optical modulator;
 operating to perform the translating the control voltage;
 supplying a bias voltage to the optical modulator via a buffer amplifier coupled to receive the voltage from the voltage-controller voltage source;
 coupling the bias voltage to a data port of the optical modulator; and
 providing the bias voltage in a stable manner to the optical modulator without using a negative power supply.

15. The method of claim 14, wherein the bias voltage is stable by fixing the bias voltage with respect to the reference voltage supply of the optical modulator.

16. The method of claim 14, wherein a bias-T coupled to receive the bias voltage from the buffer amplifier operates to perform the coupling the bias voltage to the optical modulator.

* * * * *